E. L. McCORMICK.
CATTLE GUARD.
APPLICATION FILED FEB. 11, 1914.
1,108,202.
Patented Aug. 25, 1914.
2 SHEETS—SHEET 2.
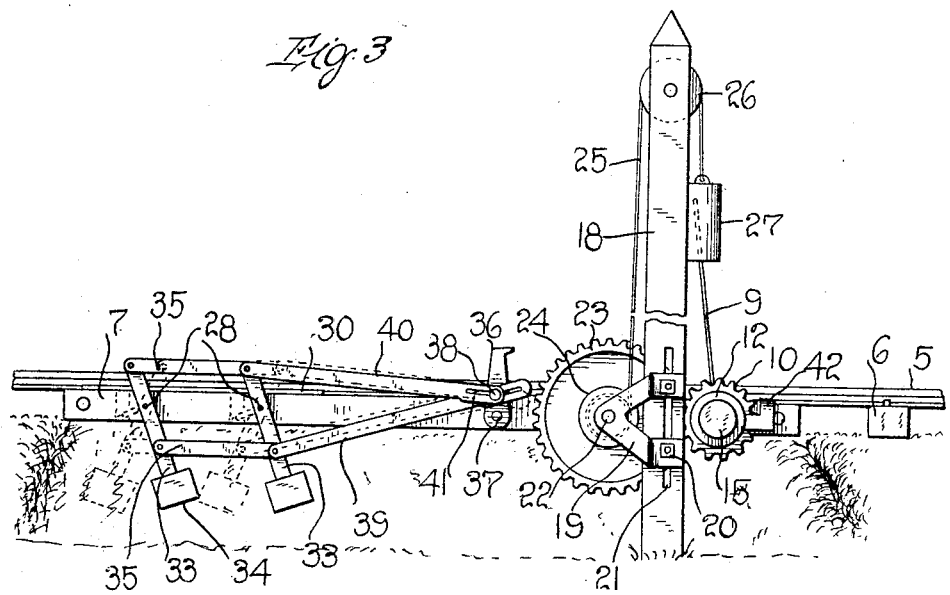
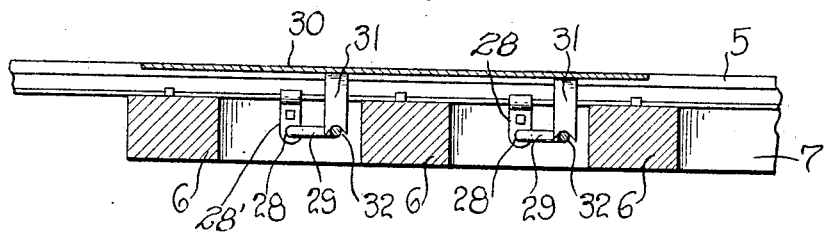
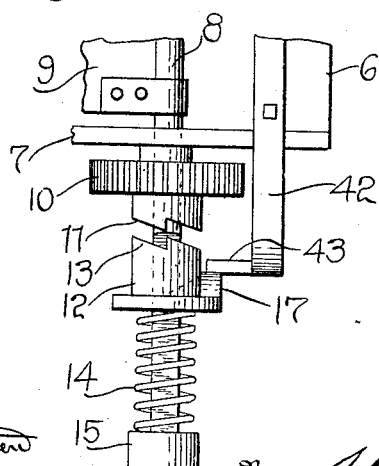
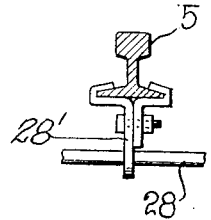
Witnesses
Robert M. Sutphen
V. J. Klowrick
Inventor
E. L. McCORMICK
By Watson E. Coleman
Attorney

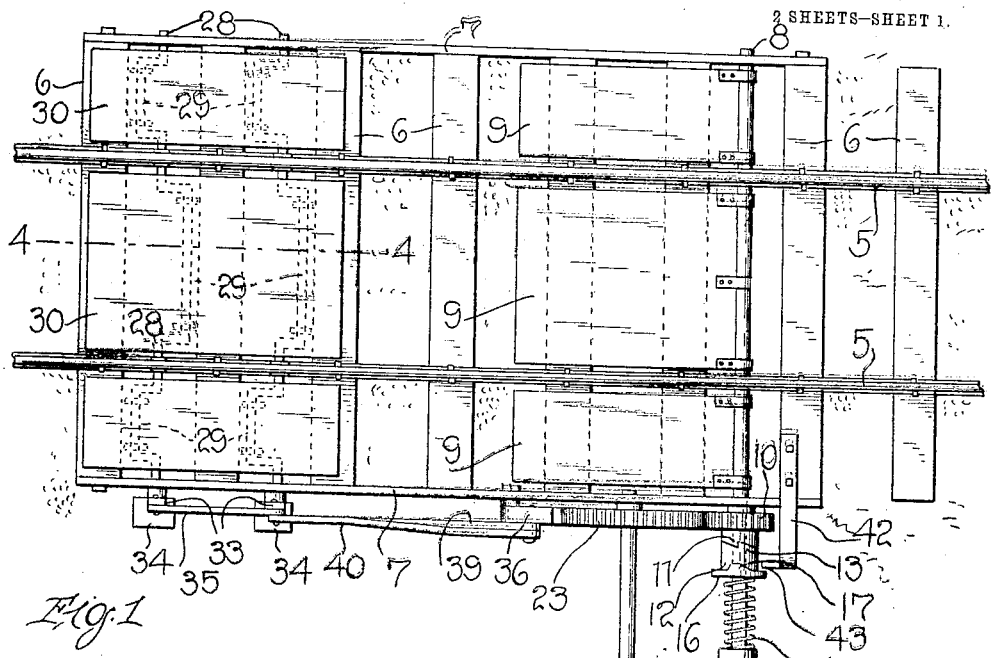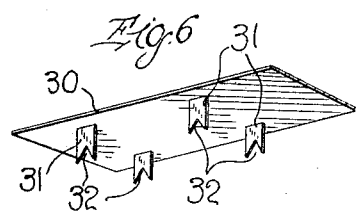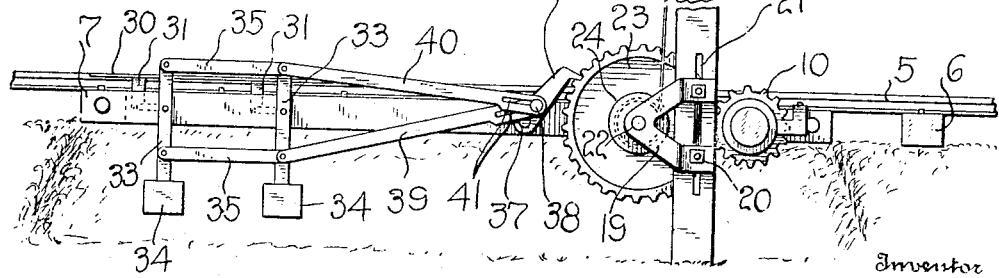

UNITED STATES PATENT OFFICE.

EDMUND L. McCORMICK, OF ST. LOUIS, MISSOURI.

CATTLE-GUARD.

1,108,202.  Specification of Letters Patent. Patented Aug. 25, 1914.

Application filed February 11, 1914. Serial No. 818,132.

*To all whom it may concern:*

Be it known that I, EDMUND L. McCORMICK, a citizen of the United States, residing at St. Louis, in the State of Missouri, have invented certain new and useful Improvements in Cattle-Guards, of which the following is a specification, reference being had to the accompanying drawings.

This invention relates to an improved cattle guard for railroads and has for its primary object to provide a device of this character which is automatically operated by the weight of an animal to present a barrier to its further advance along the railroad track.

The invention has for a more particular object to provide a plurality of movable barrier plates normally arranged in horizontal position between and at each side of the track, means for elevating said plates to a vertical position, a trip device holding said means against operation, and additional means also arranged between and at each side of the track and operatively connected to the trip device, said latter means being actuated by the weight of an animal stepping upon the same to release the trip whereby the barrier plates are elevated to their vertical position.

The invention has for still another object to produce a cattle guard which is comparatively simple in its construction, very reliable and effective in operation and extremely durable in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a top plan view of my improved cattle guard; Fig. 2 is a side elevation thereof; Fig. 3 is a view similar to Fig. 2, the barrier plates being illustrated in their elevated positions; Fig. 4 is a section taken on the line 4—4 of Fig. 1; Fig. 5 is an enlarged fragmentary plan view showing the sliding clutch member in its released position; Fig. 6 is a detail perspective view of one of the tread plates. Fig. 7 is a detail section illustrating the mounting of the rock shafts.

Referring in detail to the drawings, 5 designates the rails which are secured upon the spaced ties 6 in the usual manner. To the opposite ends of a series of ties, the parallel longitudinal bars 7 are secured. A transverse shaft 8 extending beneath the rails 5 is rotatably mounted in these longitudinal bars and to said shaft between and at each side of the rails 5 the barrier plates 9 are fixed. As shown in Fig. 1, these plates normally occupy horizontal positions and are disposed below the treads of the rails 5 and upon the ties 6 so that they will in no wise interfere with the passage of a train over said rails. Upon the shaft 8 adjacent one of the longitudinal bars 7, a pinion 10 is loosely mounted, said pinion being provided with clutch teeth 11. One end of the shaft 8 is of rectangular form in cross section and upon the same, the clutch member 12 is slidably mounted, said member being provided with the teeth 13 on one end disposed reversely to the clutch teeth 11. This clutch member is normally held in locked engagement with the clutch of the pinion 10 by means of a coil spring 14 which is arranged between the sliding clutch member and the head 15 provided upon one end of the shaft 8. The clutch member 12 is also formed with an annular flange 16 which is provided upon one face with a cam lug 17, the purpose of which will be more fully hereinafter set forth.

A post or standard 18 is suitably mounted at one side of the railroad track and upon the same, the bracket members 19 are arranged. These members are connected by bolts 20 which extend through the vertical slot 21 in the standard 18. It will thus be apparent that the bearing brackets can be vertically adjusted upon the post in accordance with the height of the rails above the base of the road bed. In the bracket members 19, a shaft 22 is journaled. One end of this shaft is also rotatably mounted in one of the longitudinal bars 7 and is provided with a gear wheel 23 which meshes with the pinion 10 upon the shaft 8. A drum 24 is fixed upon the shaft 23 between the bracket members 19 and to the same, one end of a wire or cable 25 is fixed. This cable passes over a sheave or pulley 26 mounted in the upper end of the standard 18 and to the same, the weight 27 is secured. It will therefore be understood that the gravity movement of the weight will effect the rotation of the shaft 22 from which rotative movement is transmitted through the gear 23 and pinion 10 to the shaft 8.

A pair of shafts 28 extend transversely beneath the track rails and are mounted in hanger bearings 28' depending from said rails, said shafts being suitably spaced from the shaft 8. Each of the shafts 28 is provided with a series of cranks 29 alternately disposed in opposite directions, corresponding cranks of said shafts extending upon the same side of the rotative axes of said shafts. Between and at each side of the track rails 5, the tread plates 30 are arranged. Each of these plates, as clearly shown in Fig. 6 of the drawings, is provided upon its under side with the depending bearing lugs 31 having V shaped notches 32 in their lower ends. These notches receive the crank portions of the shafts 28. Upon one end of each of the shafts 28, a bar 33 is fixed intermediate of its ends. Each of these bars is provided upon one end with a weight 34, said weights operating to normally hold the bars in perpendicular positions as shown in Fig. 2. Above and below the shafts 28, said bars are connected by links 35. The shaft 22 is held against rotative movement under the gravity action of the weight 27 by means of the trip dog 36 which is pivoted as at 37 upon one of the bars 7. A stud 38 is fixed to said dog adjacent to its pivoted end and a pair of levers 39 and 40 respectively are provided in their corresponding ends with slots 41 to receive said stud. The other ends of the levers 39 and 40 are pivotally connected to one of the bars 33 at the point of connection of the lower and upper links 35 respectively to said bar.

Referring more particularly to Fig. 3 of the drawings, it will be understood that when a cow or other animal approaches the guard from the center of the track and steps upon the central tread plate 30, its weight rotates the crank shafts 28, thereby moving the vertical bars 33 against the gravity action of the weights 34 and also moving the levers 39 and 40 to the positions shown in dotted lines in Fig. 3, so that the lower lever 39 which is moved toward the left, pulls upon the trip dog 36 and disengages the same from the teeth of the gear 23. The weight 27 moving downwardly, rotates the shafts 22 so that the gear 23 thereon coöperating with the pinion 10 which is locked upon the shaft 8 by the clutch member 12, will rotate said latter shaft and thereby elevate the barrier plates 9 to the vertical positions shown in said figure. When, however, the animal approaches the track from one side and steps upon one of the side tread plates 30, the lower weighted ends of the bars 33 are swung to the right and the levers 39 and 40 shifted to the positions shown in full lines in Fig. 3.

In this movement of the levers, the upper lever 40 operates to disengage the trip dog 36 from the teeth of the gear 23 so as to release the shaft 22 for rotation under the gravity movement of the weight 27. To the end of one of the ties 6, a metal bar 42 is fixed, which is provided upon one end with a lateral extension 43 for engagement by the cam lug 17 on the flange 16 of the member 12. It will thus be apparent that when the shaft 8 has been rotated through substantially ninety degrees, said lug will engage the extension 43 of the bar and the clutch member 12 will be moved longitudinally upon the shaft 8 against the action of the spring 14 to disengage the teeth of said member from the teeth 11 carried by the pinion 10. Said pinion is thus released from locked engagement upon the shaft so that the barrier plates 9 will fall or gravitate downwardly to their normal horizontal positions. A crank is then applied to the end of the shaft 22 and the same rotated to rewind the cable 25 upon the drum 24.

From the above description taken in connection with the accompanying drawings, it is believed that the construction as well as the manner of operation of my invention will be clearly and fully understood. When the animal steps upon either of the tread plates 30 and the barrier plates 9 are elevated in the manner above explained, an effective barrier is presented against the further advance of the animal along the track, and by the sudden elevation of the plates, the animal is badly frightened so that it will in all probability immediately move off of the track. Thus by means of my invention, it will be appreciated that the killing of large quantities of live stock by railroad trains may be avoided. The device as a whole is comparatively simple in its construction, and may be manufactured and installed in a railroad track at comparatively small cost. The invention is also reliable and effective in its operation and extremely strong and durable in practical use.

While I have shown and described the preferred construction and arrangement of the several parts employed, it will be understood that the invention is susceptible of considerable modification therein and I therefore reserve the privilege of resorting to all such legitimate changes as may be fairly embodied within the spirit and scope of the invention, as claimed.

Having thus described the invention, what is claimed is:

1. In a cattle guard, a shaft disposed transversely beneath the track rails, a series of barrier plates fixed upon said shaft, a second shaft geared to said first named shaft, a weight and a flexible connection between the same and the latter shaft whereby said first named shaft is rotated in the gravity movement of the weight, and the barrier plates elevated to vertical positions, a trip device normally holding the latter shaft against rotation, and animal operated means connected to the trip device, to move the same to its release position.

2. In a cattle guard, a transversely disposed shaft, a series of barrier plates fixed upon said shaft, a pinion loosely mounted upon said shaft, a movable clutch member to normally lock the pinion upon said shaft, a second shaft, a gear on the latter shaft meshing with said pinion, a gravity movable weight and a flexible connection between the same and said second shaft, a trip dog engaged with the gear on said second shaft, a crank shaft, a tread plate mounted thereon, a connection between the crank shaft and said trip dog whereby the dog is moved to its release position by the weight of an animal on the tread plate and the second shaft is rotated by the gravity movement of the weight and the barrier plates elevated to a vertical position, and means for shifting the clutch member out of locking engagement with the pinion, whereby the barrier plates will fall to their normal horizontal positions.

3. In a cattle guard, a transversely disposed shaft, a series of barrier plates fixed upon said shaft, a second shaft geared to the first named shaft, a pivoted dog engaging the gear on the latter shaft to hold the same against rotation, a pair of crank shafts, tread plates mounted upon said crank shafts, each of said shafts being provided with a plurality of cranks alternately extending in opposite directions from the rotative axis of the shaft, said tread plates being mounted upon the corresponding cranks, weighted bars fixed to one of the ends of the crank shafts and normally disposed in a vertical position, and levers connecting one of the bars upon opposite sides of the crank shaft to said trip dog whereby the dog is moved to its release position when the crank shafts are rotated in either direction to permit of the rotation of the operating shaft whereby the barrier plates are elevated to their vertical positions.

In testimony whereof I hereunto affix my signature in the presence of two witnesses.

EDMUND L. McCORMICK.

Witnesses:
SHERIDAN WEBSTER,
CHARLES A. GREEN.

Copies of this patent may be obtained for five cents each, by addressing the "Commissioner of Patents, Washington, D. C."